S. O. EDMONDS.
SYSTEM OF AUTOMOBILE TOWAGE.
APPLICATION FILED JUNE 4, 1917.
1,296,781.
Patented Mar. 11, 1919.
2 SHEETS—SHEET 1.
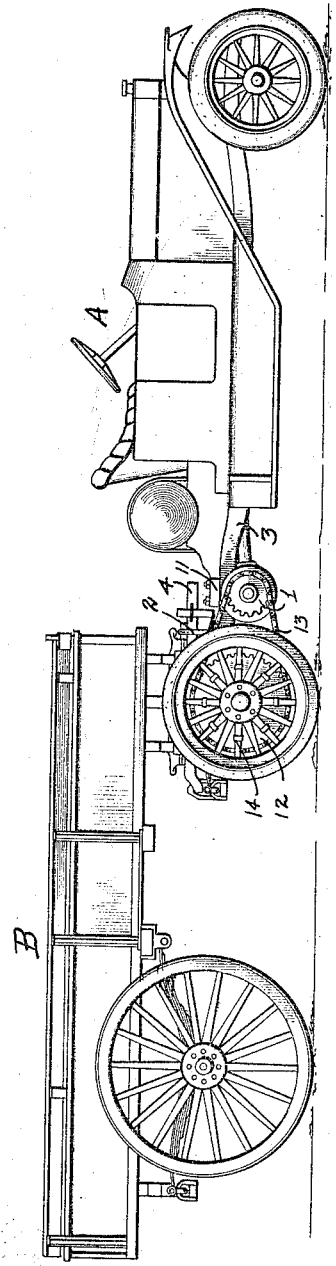
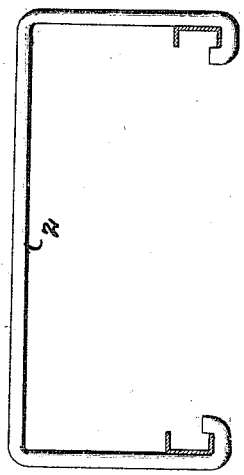
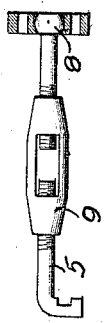
Inventor
Sterling O. Edmonds S. O. EDMONDS.
SYSTEM OF AUTOMOBILE TOWAGE.
APPLICATION FILED JUNE 4, 1917.
1,296,781.
Patented Mar. 11, 1919.
2 SHEETS—SHEET 2.
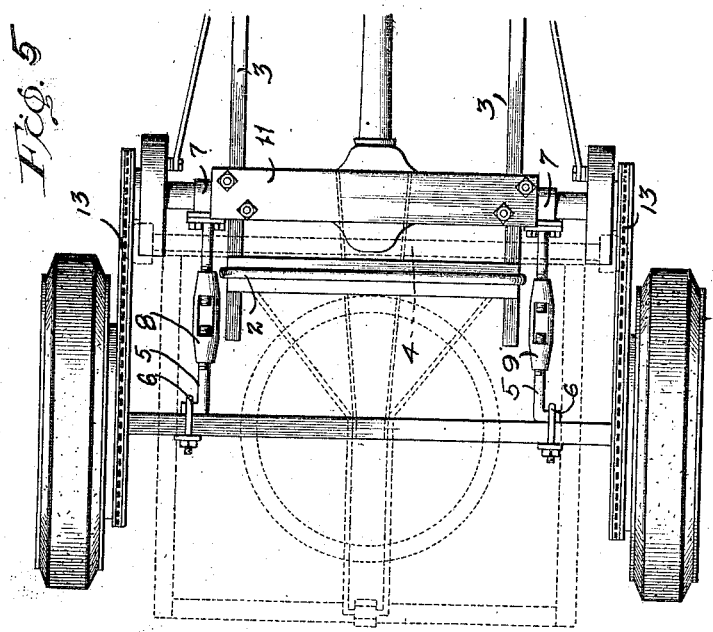
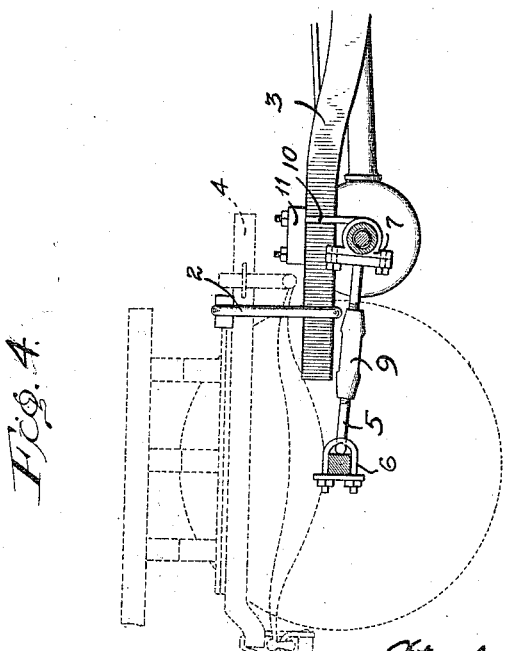
Inventor
Sterling O. Edmonds
By
Attorneys
Witness
G. F. Baker

UNITED STATES PATENT OFFICE.

STERLING OWEN EDMONDS, OF EAGLEVILLE, TENNESSEE.

SYSTEM OF AUTOMOBILE TOWAGE.

1,296,781. Specification of Letters Patent. Patented Mar. 11, 1919.

Application filed June 4, 1917. Serial No. 172,685.

*To all whom it may concern:*

Be it known that I, STERLING O. EDMONDS, a citizen of the United States, residing at Eagleville, in the county of Rutherford and State of Tennessee, have invented a certain new and useful System of Automobile Towage, of which the following is a specification.

This invention relates to a system of automobile towage and has for its primary object the provision of means whereby a conventional type of motor vehicle, generally designated an automobile, may be adapted to furnish the propelling power for a trailer, the latter being in the form of a truck, water cart or other liquid carrier, or any other vehicle devoid of a self-propelling means.

Heretofore trailers have been drawn by tractors especially designed to pilot the trailer and to furnish the power, but these tractors are usually of such construction or so connected to the trailer that they are not adapted to be used separately from the trailer. According to my invention however, I have provided means whereby an ordinary form of pleasure motor vehicle may be adapted to serve as a driving element for a trailer, the connections being such that the motor vehicle can be easily connected up with and detached from the trailer without changing any of the inherent characteristics of the motor vehicle or disturbing the general construction of the mechanical parts thereof.

According to my invention the motor vehicle may be attached to the trailer in such manner that one may have movement about a horizontal axis irrespective of the other, but so that sidewise movement will be prevented. Means is also provided for utilizing the motive power of the automobile as the driving means for the trailer. I have also provided means for maintaining the proper distance between the motor vehicle and the trailer, and I preferably utilize the distance maintaining means as a thrust element or elements between the motor vehicle and the trailer. I also utilize the driving axis of the motor vehicle for communicating motion to the driven element of the trailer.

In the particular embodiment of the invention which is selected for purposes of illustration, the system is shown as comprising a vehicle to be towed having a steering axle with ground wheels and a pilot vehicle carrying a prime mover, and having at its forward end steering ground wheels, and at its rear end an axle driven by the prime mover with means for connecting the rear end of the towing vehicle to and supporting it on the steering axle of the towed vehicle, the latter also serving as a coupling structure. The supporting and coupling structure is here shown as constructed to unite the pilot vehicle to the supporting axle of the towed vehicle while maintaining angular rigidity in a horizontal plane, in order that changes in the direction of the pilot vehicle may be readily transmitted to the steering axle of the towed vehicle or trailer.

In the drawings—

Figure 1 is a side elevational view of two existing vehicles, one of which is supported by and connected to the other by means of a towage connection above referred to;

Fig. 2 is an enlarged detail view of one of the strut members which connects the vehicle together;

Fig. 3 is an enlarged detail view of one form of hanger which is used to support the pilot vehicle on the trailer;

Fig. 4 is a side elevational view of the rear of the pilot vehicle and the front of the towed vehicle, and Fig. 5 is a top plan view of the invention showing its coöperative relationship with the connecting parts of the towed vehicle, part of which is shown in dotted lines.

Referring now to the drawings, A and B represent respectively a pilot vehicle and a towed vehicle or trailer which in the present instance are illustrated as a motor vehicle of conventional type and a dray wagon also of conventional type. In actual practice it is found desirable to employ pneumatic tires for the front wheels of the pilot vehicle, and cushion tires for the front wheels of the trailer, the rear wheels being generally supplied with metallic tires.

As heretofore indicated, the pilot vehicle may consist of any conventional type of motor vehicle, generally known as a pleasure car and adapted to carry passengers. And when it is desired to utilize the pleasure car in connection with the trailer, the rear wheels may be removed from the rear axle and drive gears 1 may be substituted therefor. The hubs of the drive gears 1 will be of such form and construction that they will be readily interchangeable with the rear wheels, so that when the rear wheels are removed the gears 1 may be substituted without rearranging any of the other parts of the car. This will enable a couple or dual braking effect to be accomplished. When the drive gears 1 are in place upon the rear axle of the pilot vehicle, the rear end of the pilot vehicle may be connected to or supported by the trailer by means of a hanger or suspension 2 which connects the chassis 3 to the bolster 4 of the trailer. The two vehicles are securely connected together by means of the struts 5 which are preferably connected to the front axle of the trailer by means of a strap 6 and to the rear or drive axle of the pilot vehicle by means of the spring securing sleeves or perches 7 which are turned at about 90 degrees from their normal positions on the axle, and each of which is adapted to receive the end of a strut 5 which is connected to it with a ball and socket connection such as 8. With the struts thus connected the turn buckles may be turned to adjust the vehicles at any desired length apart. The struts in addition to constituting distance rods also serve as thrust members between the pilot vehicle and the trailer. The hangers 10 best shown in Figs. 4 and 5 are employed for supporting the rear axle to the bolster 11 which lays across the side bars of the chassis 3. 12 represents driven gears which are provided on the front axle of the trailer, and which are in driving relation with the drive gears 1 by the sprocket chains 13. The driven gears 12 are strapped to the spokes so that the wheels will partake of any motion imparted to said gears.

From the foregoing description it will be observed that the hanger 2 is hung from a spring supported part of the trailer, and that it engages a part of the rear of the chassis of the conventional type of motor vehicle in such manner that the pilot vehicle is supported at its normal horizontal position, so that all of the mechanism will be operating under normal conditions. I am aware that the ordinary type of motor vehicle is used for driving a trailer, but where the rear wheels are jacked up or lifted above the ground, the entire mechanism is tilted forward so that there is a forward thrust imparted to all of the working parts at all times with a corresponding detriment to the same. With the arrangement described hereinbefore the working parts will be maintained in the same relative position as they would in the event that the pilot car was performing the functions for which it was intended. It will also be noticed that the rear of the automobile is adapted to swing upon the hanger or suspension 2 in a vertical plane so that there is a flexible coupling between the pilot and the trailer, but any sidewise movement of the pilot vehicle with respect to the trailer will be prevented by the struts and the sides of the hanger 2, it being understood that the major portion of the weight of the car A is supported by the hanger 2. When it is desired to disconnect the car A from the trailer B it will only be necessary to release the struts 5, detach the connectors 8 from the spring perches 7, swing the perches around to their normal position, insert the springs and take off the sprockets 1 and substitute the rear wheels. It will be observed that the vehicle A may be rendered ready for independent service in a convenient and expeditious manner, and may be as conveniently rearranged for use in connection with the trailer.

I claim:—

1. A system of automobile towage, comprising a vehicle to be towed having an axle with ground wheels; a towing vehicle carrying a prime mover and having at its forward end, steering ground wheels, and at its rear end, an axle driven by said prime mover, and a combined supporting and coupling structure connecting the rear end of the towing vehicle to, and supporting it on, the steering axle of the towed vehicle, and driving connection between said driven axle and the said ground wheels of the towed vehicle, said supporting and coupling structure embodying in its construction an inverted U-shaped hanger suspended from the towed vehicle in a manner to support the chassis of the towing vehicle and struts connecting the driven axle of the towing vehicle with the steering axle of the towed vehicle.

2. A system of automobile towage, comprising a vehicle to be towed having a steering axle with ground wheels; a towing vehicle carrying a prime mover and having at its forward end, steering ground wheels, and at its rear end, an axle driven by said prime mover, and a combined supporting and coupling structure connecting the rear end of the towing vehicle to, and supporting it on, the steering axle of the towed vehicle, and driving connection between said driven axle and the said ground wheels of the towed vehicle, said supporting and coupling structure embodying in its construction an inverted U-shaped hanger suspended from the towed vehicle and having its ends upturned in a manner to support the chassis of the towing vehicle.

3. A system of automobile towage for existing vehicles, comprising a vehicle to be towed having a steering axle with ground wheels; a towing vehicle carrying a prime mover and having at its forward end, steering ground wheels, and at its rear end, an axle driven by said prime mover, and a combined supporting and coupling structure connecting the rear end of the towing vehicle to, and supporting it on, the steering axle of the towed vehicle, and driving connection between said driven axle and the said ground wheels of the towed vehicle, said supporting and coupling structure embodying in its construction an inverted U-shaped hanger suspended from the towed vehicle and having its ends upturned in a manner to support the chassis of the towing vehicle and struts connecting the driven axle of the towing vehicle with the steering axle of the towed vehicle.

The foregoing specification signed at Nashville, Tenn., this 28th day of April, 1917.

STERLING OWEN EDMONDS.

Copies of this patent may be obtained for five cents each, by addressing the "Commissioner of Patents, Washington, D. C."